United States Patent
Su et al.

(10) Patent No.: US 10,012,553 B2
(45) Date of Patent: Jul. 3, 2018

(54) COATED NANOFILLER/POLYMER COMPOSITE SENSOR NETWORK FOR GUIDED-WAVE-BASED STRUCTURAL HEALTH MONITORING

(71) Applicant: THE HONG KONG POLYTECHNIC UNIVERSITY, Hong Kong (HK)

(72) Inventors: Zhongqing Su, Hong Kong (HK); Limin Zhou, Hong Kong (HK); Zhihui Zeng, Hong Kong (HK); Menglong Liu, Hong Kong (HK); Hao Xu, Hong Kong (HK)

(73) Assignee: THE HONG KONG POLYTECHNIC UNIVERSITY, Hong Kong (HK)

( * ) Notice: Subject to any disclaimer, the term of this patent is extended or adjusted under 35 U.S.C. 154(b) by 0 days.

(21) Appl. No.: 15/235,113

(22) Filed: Aug. 12, 2016

(65) Prior Publication Data
US 2018/0045588 A1 Feb. 15, 2018

(51) Int. Cl.
*G01M 5/00* (2006.01)
*G01L 1/22* (2006.01)
(Continued)

(52) U.S. Cl.
CPC .............. *G01L 1/225* (2013.01); *B05D 1/325* (2013.01); *B29C 67/0051* (2013.01);
(Continued)

(58) Field of Classification Search
CPC ............ G06K 9/0002; G06K 9/00053; G06K 9/00087; G06K 9/20; G06K 7/08;
(Continued)

(56) References Cited

U.S. PATENT DOCUMENTS 7,325,456 B2 * 2/2008 Kim ........................ G01H 9/004
73/587
7,434,480 B2 * 10/2008 Georgeson ................ G01B 7/20
73/776

(Continued)

OTHER PUBLICATIONS

Ajay Raghavan and Carlos E. S. Cesnik, entitled "Review of Guided-wave Structural Health Monitoring," The Shock and Vibration Digest, Mar. 2007; 39; 91.

*Primary Examiner* — Harshad R Patel
*Assistant Examiner* — Brandi Hopkins
(74) *Attorney, Agent, or Firm* — Spruson & Ferguson (Hong Kong) Limited (57) ABSTRACT

A method for forming a structural-strain sensor network on a structure is provided. The sensor network has plural nanocomposite sensing elements having high sensitivity, and can be quickly fabricated. The method comprises attaching a molding layer having openings onto the surface, and filling the openings with a coating material made of nanocomposite hybrid material. After immobilizing the coating material in the openings, the sensing elements are formed and the molding layer is removed. Electrical wires are formed on the surface such that two opposite electrodes are formed on each sensing element. The resistance between the two electrodes indicates a strain experienced. The sensor network finds applications in identifying a damaged location or an impact location on the structure for structural health monitoring. Voltage waveforms measured at the sensing elements are analyzed to estimate the damaged location or the impact location according to a guided-wave propagation model.

15 Claims, 13 Drawing Sheets

(51) Int. Cl.
  *B05D 1/32* (2006.01)
  *B29C 67/00* (2017.01)
  *B33Y 10/00* (2015.01)
  *G01M 99/00* (2011.01)
  *B29L 31/34* (2006.01)

(52) U.S. Cl.
  CPC ............ *B33Y 10/00* (2014.12); *G01L 1/2287* (2013.01); *G01M 99/007* (2013.01); *B05D 2520/10* (2013.01); *B05D 2601/20* (2013.01); *B29L 2031/34* (2013.01)

(58) Field of Classification Search
  CPC ............... G06K 9/209; G06K 9/00013; G06K 9/00006; G01N 27/045; C08K 7/00; C08K 2003/2241; C08K 2003/2272; C08K 7/24; C08K 3/22; C08K 2003/2296; C08K 2201/001; H01L 23/564; H01L 23/28; H01L 23/3178; H01L 2924/0002; H01L 2924/00; H01L 23/562; H01L 23/26
  See application file for complete search history.

(56) References Cited

U.S. PATENT DOCUMENTS

| | | | | |
|---|---|---|---|---|
| 7,743,659 B2 * | 6/2010 | Kearns | .................... | G01M 5/00 73/632 |
| 2005/0067559 A1 * | 3/2005 | Ogisu | .................. | G01M 11/086 250/227.14 |
| 2011/0142091 A1 * | 6/2011 | Wardle | .................... | B82Y 15/00 374/45 |

* cited by examiner

COATED NANOFILLER/POLYMER COMPOSITE SENSOR NETWORK FOR GUIDED-WAVE-BASED STRUCTURAL HEALTH MONITORING

FIELD OF THE INVENTION

The present invention generally relates to a structural-strain sensor network made of nanocomposite hybrid material, for measuring a strain of a structure. In particular, the present invention relates to the fabrication of this sensor network and applications thereof for structural health monitoring (SHM).

BACKGROUND

Utilization of nanocomposite sensors for structural strain measurement has been widely studied. The basic mechanism of strain sensing is that a network formed by nanofillers is deformed in the presence structural strains, and such network deformation causes changes in the resistance value of a sensor formed by the nanofiller network. Thus, through resistance measurement, the levels of structural strains can be, in theory, captured and quantified.

There are many different types of nanofillers, including carbon nanotube (CNT), carbon black (CB), graphene, etc. The types of polymer matrix for housing nanofillers can also be chosen from a wide range, for example, polyvinylidene fluoride (PVDF) or polyvinyl chloride (PVC). The major advantages of nanocomposite sensors over other types of sensors, such as lead zirconate titanate (PZT) sensors, are that their material properties are with preferable flexibility, the material can be freely coated on tested structures with desired geometry, and the cost of manufacturing the nanocomposite sensors can be very low. Such features are of great importance for SHM because it provides a suitable way of achieve a satisfactory balance between the "sensing density" and the "sensor cost" It follows that a highly dense sensor network can be conveniently formed on a structural surface with a low cost, being able to identify damage at a micro scale.

However, existing nanocomposite sensors suffer from two major limitations: (1) limited studies of coating technologies that can be used to generate sensor networks fast and effectively; and (2) lacking of development in distributed sensor networks for guided-wave-based impact/damage identification. Therefore, further development is needed to promote the application of nanocomposite sensors in SHM.

SUMMARY OF THE INVENTION

The present invention is concerned with a structural-strain sensor network using nanocomposite sensing elements for measuring strain values at different locations on a structure, and applications of such sensor network for identifying a damaged location or an impact location on the structure according to the guided-wave propagation theoretical framework.

A first aspect of the present invention is to provide a method for forming the structural-strain sensor network on a surface of the structure. The method has an advantage that the sensor network can be quickly and effectively generated. The sensor network comprises plural nanocomposite sensing elements dimensioned and located according to a pre-determined floor plan. All the sensing elements have a pre-determined thickness.

The method comprises obtaining a coating material used for forming the sensing elements. The coating material is a nanocomposite hybrid material under a semi-liquid state. The nanocomposite hybrid material is a composite comprising nanofillers and a thermoplastic polymer. The method further comprises attaching a molding layer onto the surface. The molding layer comprises plural openings dimensioned and located according to the floor plan, and has a thickness substantially similar to the pre-determined thickness of all the sensing elements. After the molding layer is attached to the surface, the openings are filled with the coating material. The coating material that resides in the openings is immobilized to form the sensing elements on the surface. In particular, an entirety of the sensing elements is collectively formed in two steps of filling the openings and immobilizing the coating material without a need to individually form each of the sensing elements. After the sensing elements are formed, the molding layer is peeled off from the surface. Afterwards, electrical wires are formed over the surface, such that two opposite electrodes are formed on an individual sensing element and the two opposite electrodes are electrically accessible via two of the electrical wires. The variation ratio of a resistance value of the individual sensing element, measurable through the aforesaid two of the electrical wires, corresponds to a strain experienced at a location of the surface on which the individual sensing element is located.

A second aspect of the present invention is to provide a method for locating a damaged location on the structure.

The method comprises forming a structural-strain sensor network on the surface of the structure according to any embodiment disclosed in the first aspect of the present invention. The method further comprises connecting the electrical wires to a plurality of resistance-to-voltage transformation circuits such that the resistance value of the individual sensing element is measured by one of the resistance-to-voltage transformation circuits and is reported as a voltage value. In the method, one or more actuators are attached on the surface. Furthermore, an individual actuator is controllable to produce a pre-determined mechanical-disturbance waveform on which the individual actuator is located. The resistance value of the individual sensing element is measured over time while exciting the individual actuator to produce the pre-determined mechanical-disturbance waveform. Thereby, a plurality of voltage waveforms measured at the sensing elements is obtained. The plurality of measured voltage waveforms is analyzed to estimate the damaged location. The damaged location is estimated according to a guided-wave propagation model.

A third aspect of the present invention is to provide a method for determining whether an impact is received on a structure and for locating the impact if the impact is received.

The method comprises forming a structural-strain sensor network on the surface of the structure according to any embodiment disclosed in the first aspect of the present invention. The method further comprises connecting the electrical wires to a plurality of resistance-to-voltage transformation circuits such that the resistance value of the individual sensing element is measured by one of the resistance-to-voltage transformation circuits and is reported as a voltage value. The resistance value of the individual sensing element is measured over time to thereby obtain a plurality of voltage waveforms measured at the sensing elements. The plurality of measured voltage waveforms is analyzed to determine whether the impact is received on the surface, and to estimate the location of the impact on the surface when it is determined that the impact is received. The impact location on the surface is estimated according to a guided-wave propagation model.

Other aspects of the present invention are disclosed as illustrated by the embodiments hereinafter.

DETAILED DESCRIPTION

As used herein, "a structure" means a combination of members connected together in such a way to serve a useful purpose. The useful purpose may be related to civil engineering and mechanical engineering, to name a few. Examples of the structure related to the domain of civil engineering include a building, a part thereof such as a wall, a dam and a bridge. In the domain of mechanical engineering, examples of the structure include a car, a train, an aircraft, a machine, a water pipe, an oil pipe, etc.

The present invention first provides a structural-strain sensor network having plural sensing elements and fabricated on a structure for measuring strains at different locations on a surface of the structure. The disclosed sensor network has dual advantages that its fabrication is quick and the sensor network has a high sensitivity (i.e. being effective). The present invention also provides a technique of using the disclosed sensor network to locate a damaged location on the structure, and a similar technique to estimate a location of an impact when it is received by the structure, both based on the guided-wave propagation theoretical framework. The identification of the damaged location and/or the impact location is useful for SHM. In particular, the techniques provided here are especially advantageous for SHM for mechanical structures made of metal or fiber-reinforced composite as the guided-wave propagation theoretical framework is particularly accurate for these mechanical structures.

A first aspect of the present invention is to provide a method for forming a structural-strain sensor network on a surface of a structure.

The sensor network comprises plural sensing elements. An individual sensing element is used for measuring a strain on a location at which the individual sensing element is located. Advantageously, to keep a low fabrication cost and maintain a simple procedure for quickly fabricating the sensor network while enabling the sensor network to have a high sensitivity in measuring strain, nanocomposite sensing elements are selected to be used in the sensor network. In particular, each of the sensing elements is made of a composite comprising nanofillers and a thermoplastic polymer. Examples of the nanofillers suitable for forming the sensing elements include carbon nanotube (CNT), carbon black (CB), graphene, or a combination thereof. Examples of the thermoplastic polymer include polyvinyl chloride (PVC), polyvinylidene fluoride (PVDF), etc.

In addition, the sensor network is planar, and is formed on and attached to the surface of the structure. All the sensing elements have a pre-determined thickness. As mentioned above, a value of strain measured by the individual sensing element corresponds to a resistance value measured by such sensing element. The uniformity in thickness among the sensing elements simplifies estimation of the strain values measured by them. Furthermore, the nanocomposite sensing elements are dimensioned and located according to a pre-determined floor plan. In one practical option, all the sensing elements are substantially similar. Nonetheless, the present invention is not limited only to this option. The sensing elements may be different to suit different practical situations.

Figure 1:
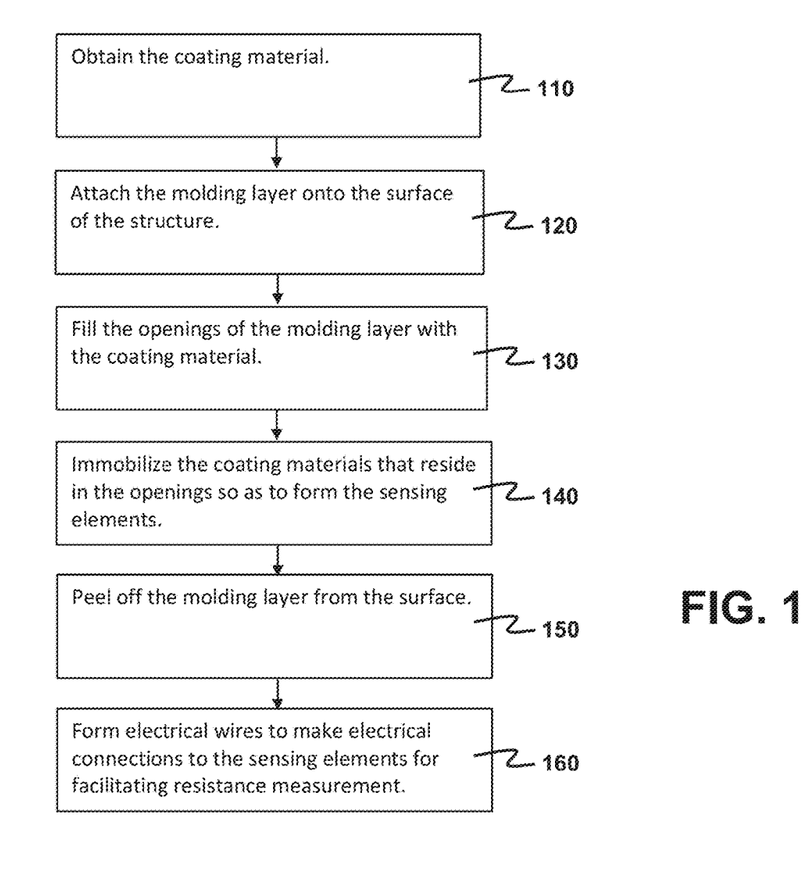
FIG. 1 depicts a flowchart illustrating the steps for fabricating a structural-strain sensor network according to an exemplary embodiment of the present invention.

The method for forming the sensor network as disclosed herein is exemplarily illustrated with the aid of FIG. 1, which depicts a flowchart about the steps for fabricating the sensor network.

In a step 110, a coating material used for forming the sensing elements is obtained. The coating material is a nanocomposite hybrid material under a semi-liquid state. As mentioned above, the nanocomposite hybrid material is a composite comprising nanofillers and a thermoplastic polymer.

In one embodiment, the obtaining of the coating material includes preparing the coating material. In the preparation of the coating material, the thermoplastic polymer and the nanofillers are mixed under a temperature to form the nanocomposite hybrid material. For most types of thermoplastic polymer that is used, the temperature is selected to be between 180 to 200 degrees Celsius. The mass ratio of the nanofillers to the polymer is selected to be substantially close to a percolation threshold. Generally, the mass ratio is chosen to be within 100% to 120% of the percolation threshold. The nanocomposite hybrid material that is formed is added with a solution for maintaining the coating material to be in the semi-liquid state. An example of this solution is N-methyl-2-pyrrolidone (NMP).

Steps 120, 130, 140, 150 and 160 of the method are illustrated with reference to FIGS. 2A-2D. In FIGS. 2A-2D, the structure, the surface and the sensing elements are referenced with numerals 210, 215 and 230, respectively.

Figure 2A:
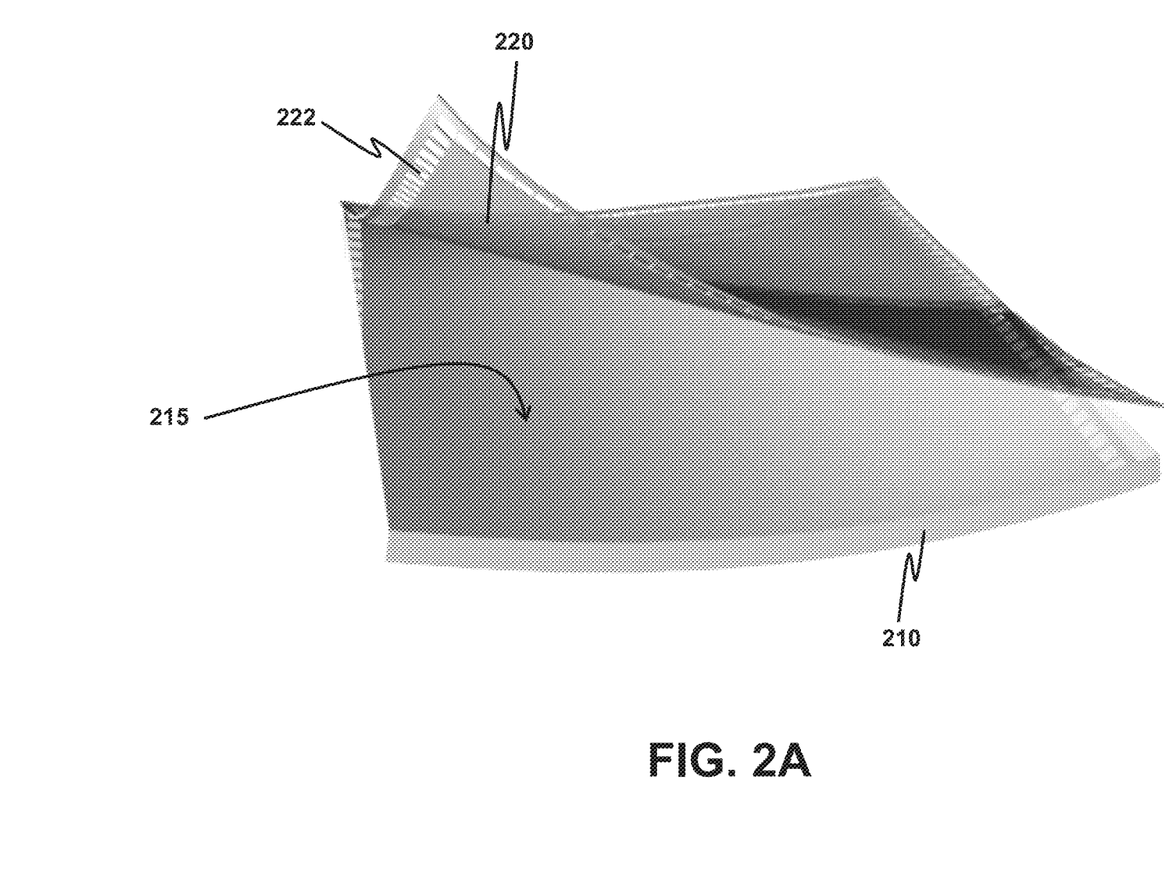
FIG. 2A depicts attaching a molding layer onto a structure's surface in a step of the disclosed method, where the molding layer comprises plural openings defining shapes and sizes of plural sensing elements of the sensor network.

Refer to FIG. 2A. In the step 120, a molding layer 220 comprising plural openings 222 is attached onto the surface 215. The molding layer 220 is impermeable to the coating material, and it is intended that the coating material disperses on the surface 215 only at the openings 222 to define the shapes and sizes of the sensing elements 230. Therefore, the openings 222 are dimensioned and located on the molding layer 220 according to the above-mentioned floor plan. In addition, the molding layer 220 has a thickness substantially similar to the pre-determined thickness of all the sensing elements 230.

Figure 2B:
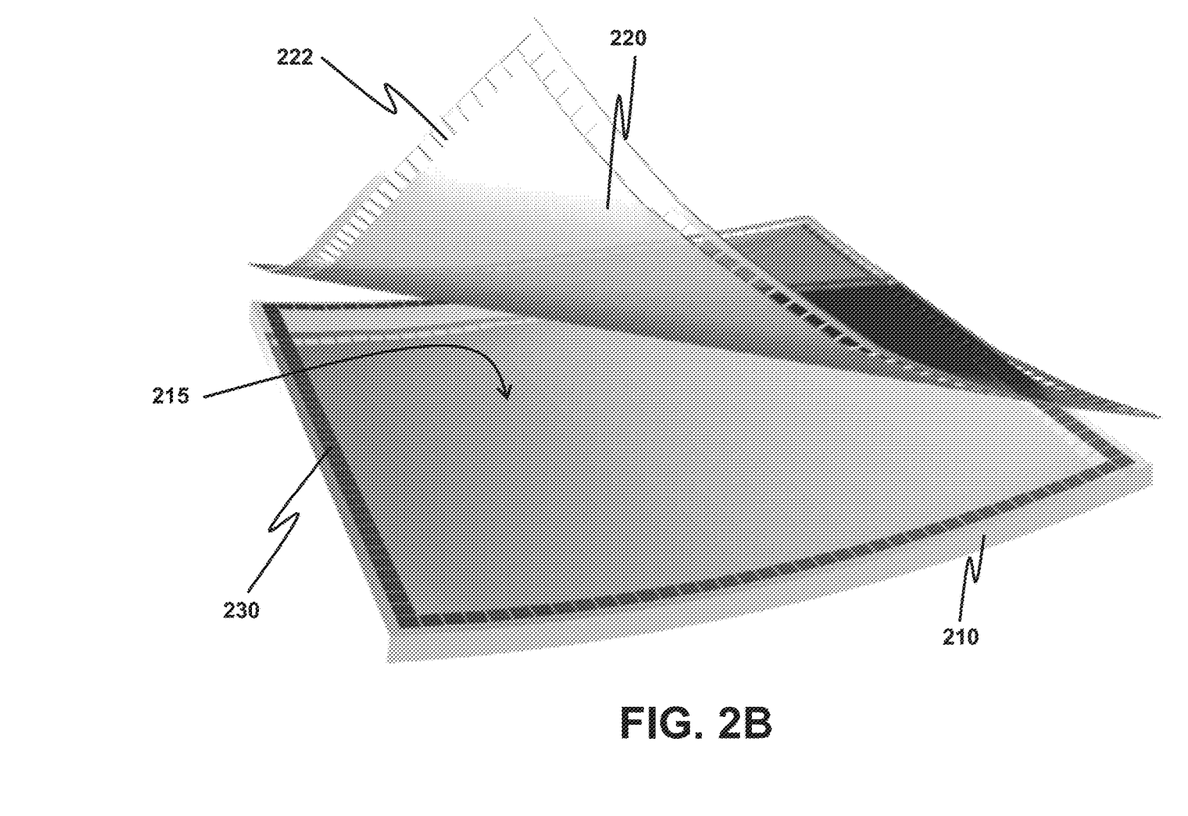
FIG. 2B illustrates that the sensing elements are defined on the surface according to the locations and the shapes of the openings.

After the molding layer 220 is attached to the surface 215, the openings 222 are filled with the coating material in the step 130. Since the thickness of the molding layer 220 coincides with the pre-determined thickness of the sensing elements 230, the coating material only needs to just fill up the openings 222. FIG. 2B depicts that the sensing elements 230 are defined on the surface 215 according to locations and shapes of the openings 222.

In the step 140, the coating material that resides in the openings 222 are immobilized to form the sensing elements 230 on the surface 215. It follows that an entirety of the sensing elements 230 is collectively formed by performing the two steps 130, 140 without a need to individually form each of the sensing elements 230. Hence, the disclosed method offers simplicity in fabrication, leading to an advantage of fast fabrication. Since the coating material is in the semi-liquid state, immobilization of the coating material can be achieved by evaporating away the solution previously added in the coating material. For many choices of the solution (e.g. NMP), evaporation of the solution can be done at room temperature, or can be speeded up by heating the coating material.

Figure 2C:
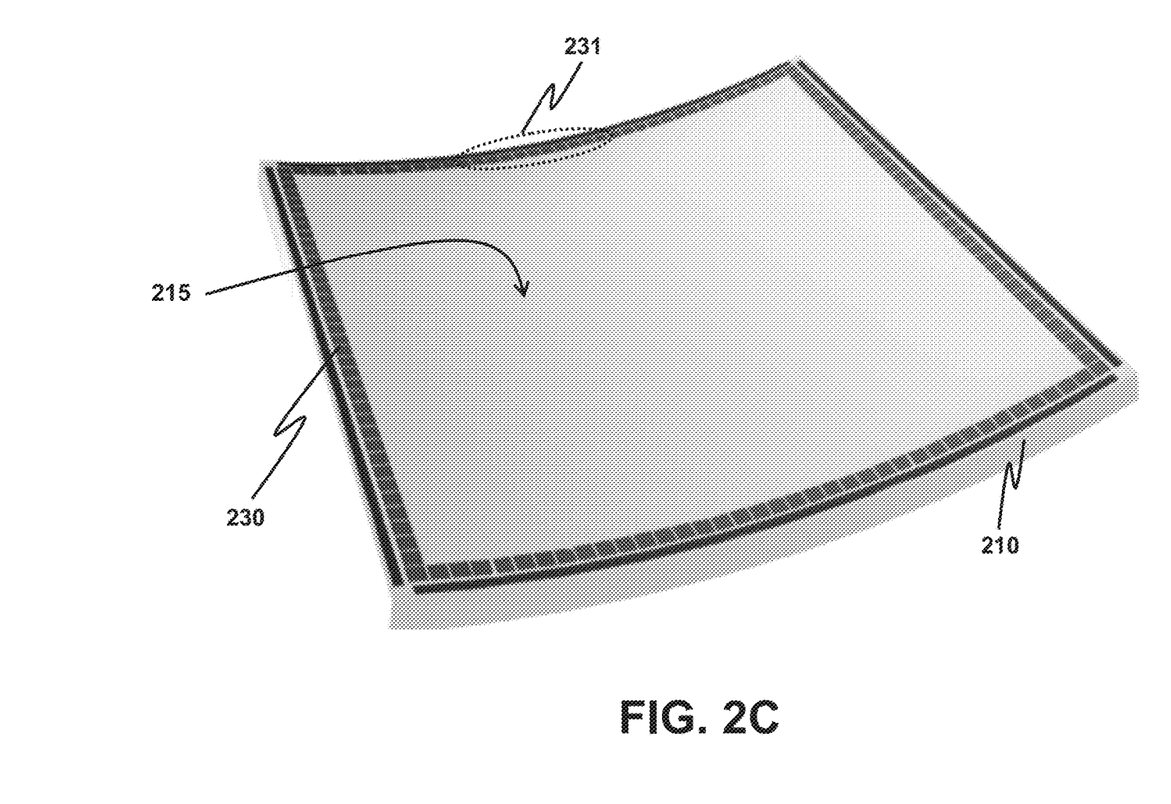
FIG. 2C illustrates that after the molding layer is removed, the sensing elements remain on the surface and are attached thereon.

After the sensing elements 230 are formed, the molding layer 220 is peeled off from the surface 215 in the step 150. FIG. 2C depicts that after the molding layer 220 is removed, the sensing elements 230 remain on the surface 215 and are attached thereon.

Figure 2D:
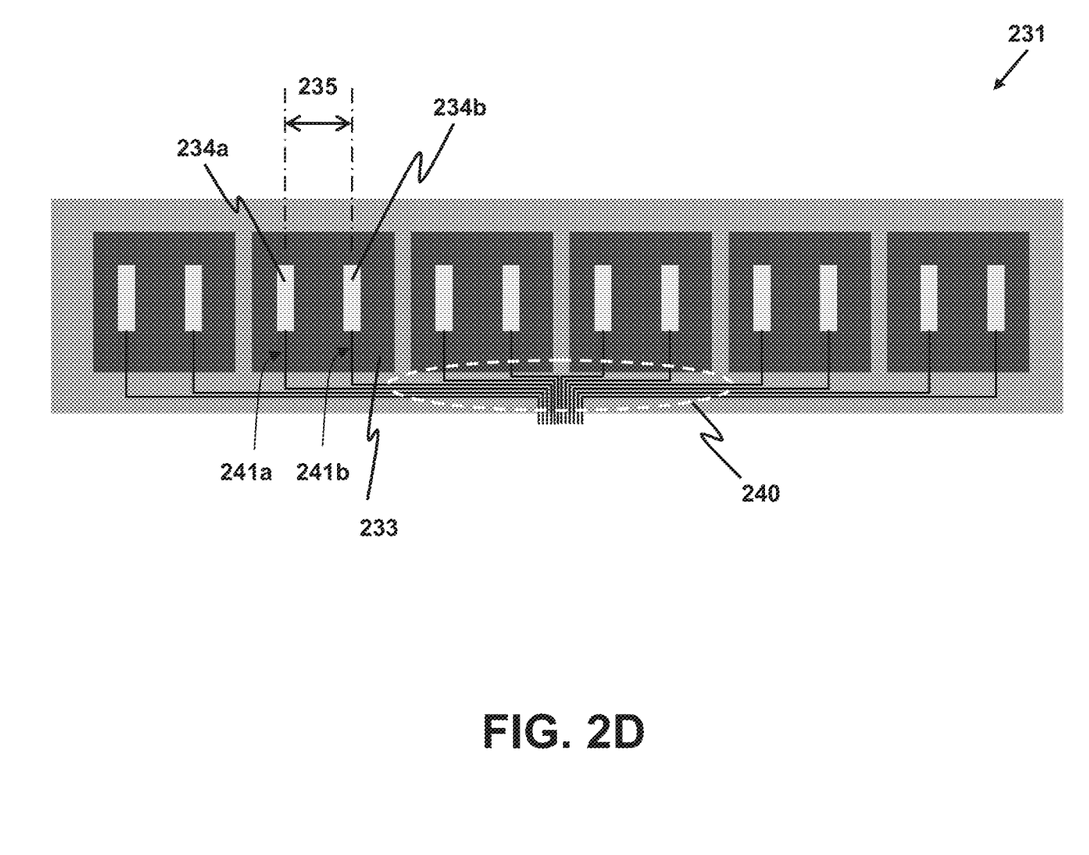
FIG. 2D depicts a section of the sensing elements for illustrating the step of forming electrical wires on the surface in the disclosed method.

FIG. 2D depicts a section 231 of the sensing elements 230 for illustrating the step 160. The section 231 comprises a selected sensing element 233 as a representative one used in the forthcoming illustration. In the step 160, electrical wires 240 are formed on the surface 215. As a result of the formation of the electrical wires 240, two opposite electrodes 234a, 234b are formed on the selected sensing element 233. The two electrodes 234a, 234b are electrically accessible via two of the electrical wires 240 (indicated as a first electrical wire 241a and a second electrical wire 241b). Hence, a resistance value of the selected sensing element 233 is measurable through the first and second electrical wires 241a, 241b. In the presence of strain, the length 235 between the two opposite electrode 234a, 234b varies (normally in a micro scale), and this length 235 depending on the value of the strain. Therefore, the measured variation ratio of resistance value corresponds to the strain experienced at a location of the surface 215 on which the selected sensing element 233 is located.

Figure 3:
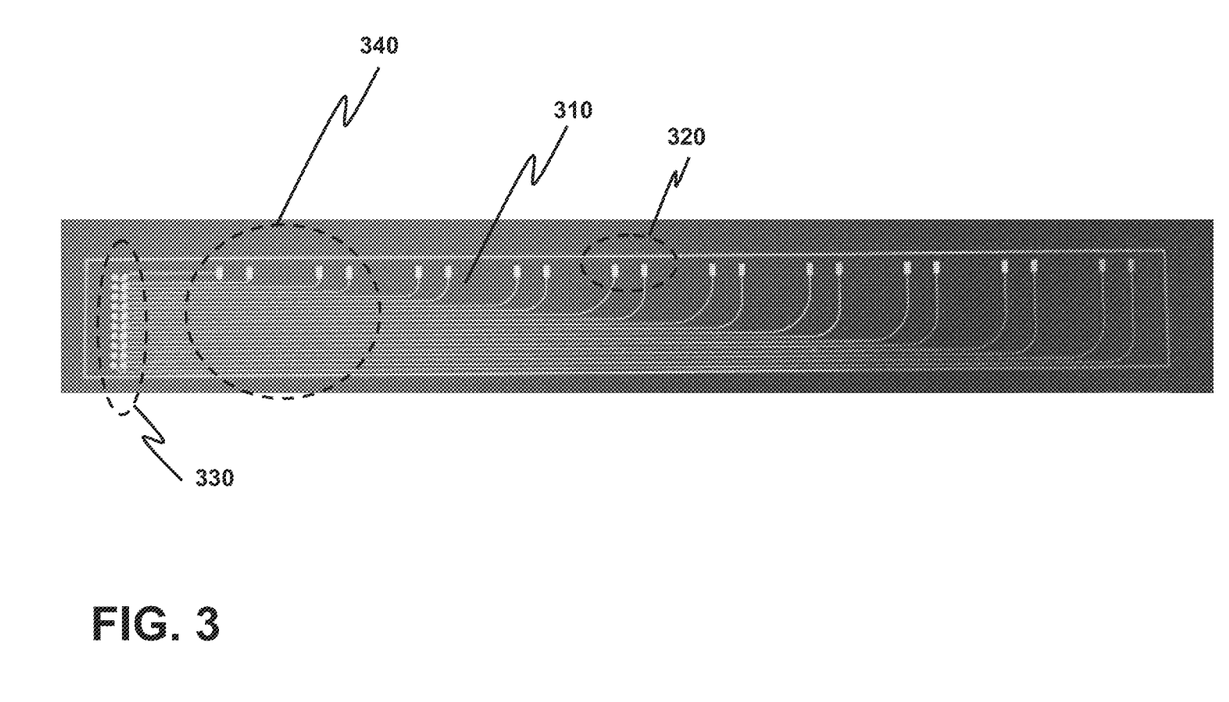
FIG. 3 depicts one example of a flexible layer that has electrical wires thereon and that is arranged to attach to the surface on the sensing elements to provide electrical connection to the sensing elements.

In one embodiment, the step 160 includes forming a flexible layer having the electrical wires 240 printed thereon, and then attaching the flexible layer onto the surface 215 at a location selected such that the two opposite electrodes 234a, 234b on the selected sensing element 233 are formed. Note that the flexible layer covers all the sensing elements 230, thereby offering protection to the sensing elements 230 as an additional advantage. FIG. 3 depicts an example of such flexible layer. A flexible layer 310, which is preferably transparent for enabling the flexible layer 310 to be aligned with the sensing elements 230 on the surface 215, are printed with electrical wires 340. As an illustrative example, two electrodes 320 are formed at two ends of the electrical wires 340. Also, a number of ends 330 of the electrical wires 340 are clustered together for acting as external connections during resistance measurement.

Figure 4:
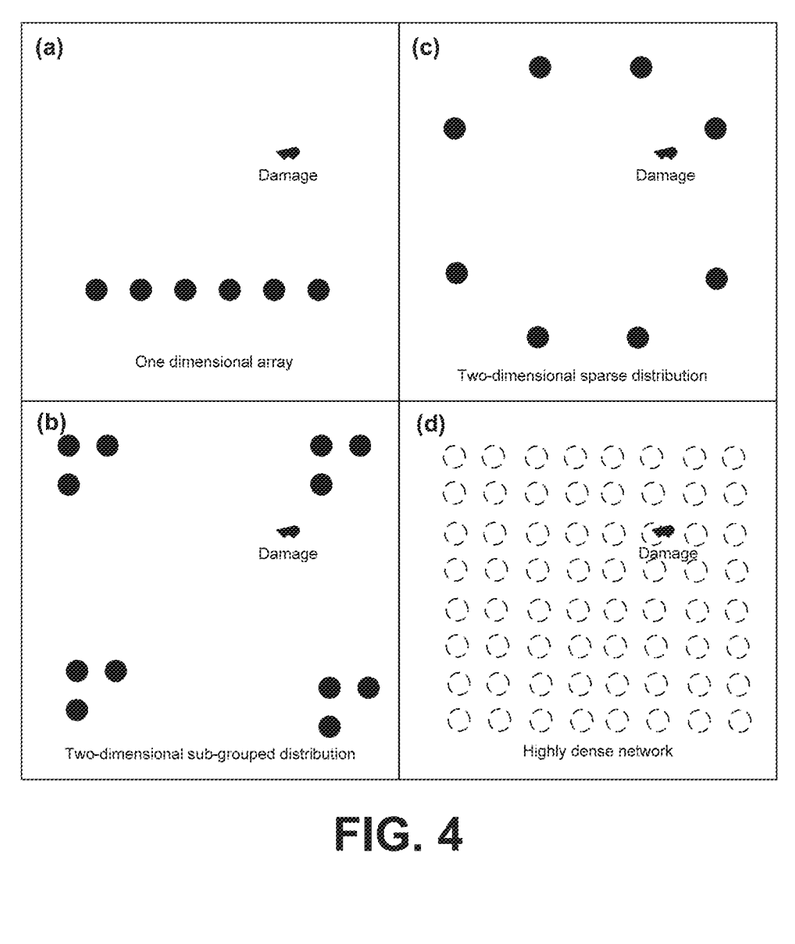
FIG. 4 depicts different examples for illustrating possible arrangements of the sensing elements in sensor network.

Note that in FIGS. 2A-2C, the sensing elements 230 are distributed along a periphery of the floor plan. Although this arrangement is a simple choice, the present invention is not limited only to this arrangement. In some practical situations, other arrangements of the sensing elements 230 may be advantageous. Examples of other arrangements are shown in FIG. 4. Subplots (a)-(d) of FIG. 4 depict a one-dimensional array, a two-dimensional subgroup distribution, a two-dimensional sparse distribution and a highly dense network, respectively. In general, a denser network achieves a higher accuracy in certain applications of the sensor network, e.g., in identifying a damaged location or an impact location on the surface 215.

A second aspect of the present invention is to provide a method for locating a damaged location on the structure 210. In particular, the sensor network as disclosed according to the first aspect of the present invention is used.

Figure 5:
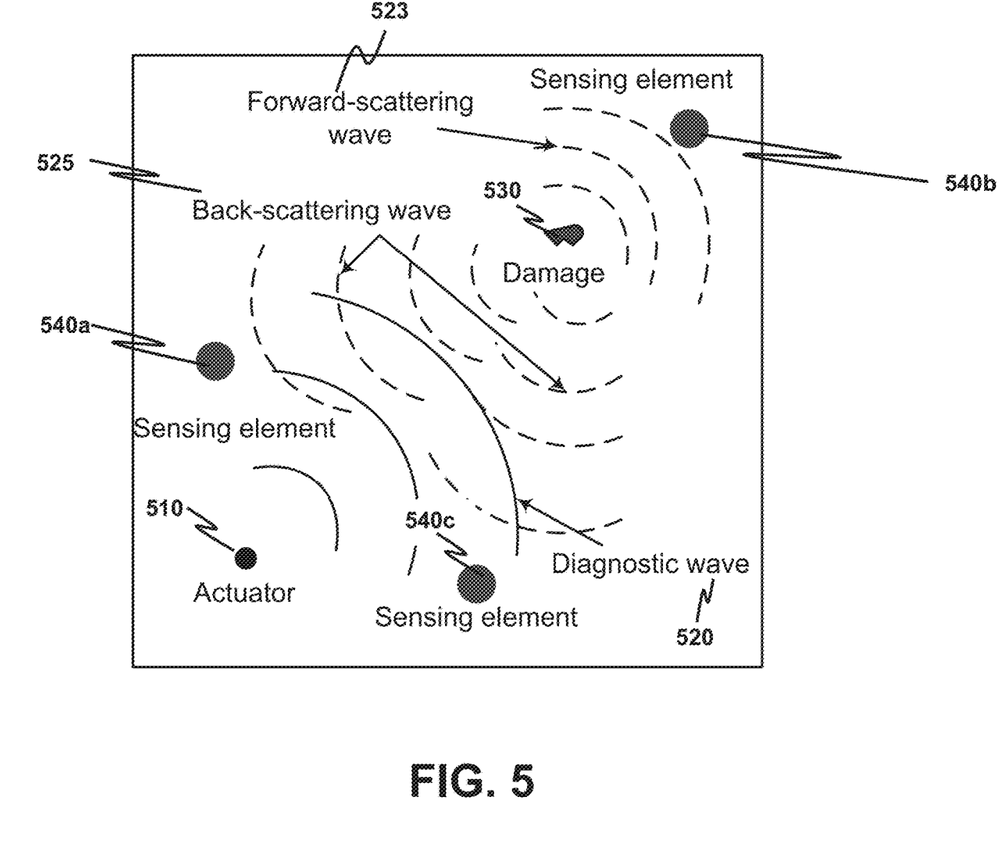
FIG. 5 depicts a simplified diagram for illustrating the determination of the damaged location.

FIG. 5 depicts a simplified diagram for explaining how to determine the damaged location. An actuator 510 is used to generate a diagnostic wave 520. When the diagnostic wave 520 reaches a damage 530, the damage 530 scatters the diagnostic wave 520 into a forward-scattering wave 523 and a backward-scattering wave 525. The forward-scattering wave 523 and the backward-scattering wave 525 are then captured by plural sensing elements 540a-540c as captured signal waveforms. Since the forward- and backward-scatting waves 523, 525 travel with some propagation speed, the location of the damage 530 can be estimated according to the traveling times of the various waves 520, 523, 525 as revealed from the captured signal waveforms. In the art, it is known that a guided-wave propagation model can be used to estimate the location of the damage 530 from the captured signal waveforms. The development of the guided-wave propagation model can be found in references such as: the book of V. Giurgiutiu, *Structural health monitoring with piezoelectric wafer active sensors*, Elsevier Academic Press, New York (2008), the disclosure of which is hereby incorporated by reference; and the paper of Ajay Raghavan and Carlos E. S. Cesnik, entitled "Review of Guided-wave Structural Health Monitoring," *The Shock and Vibration Digest*, March 2007; 39; 91, the disclosure of which is incorporated by reference herein. Note that the sensing elements 540a-540c are able to capture guided waves (including the diagnostic wave 520, the forward-scattering wave 523 and the backward-scattering wave 525) propagated from a considerably long distance away. Thus, a few number of sensing elements can cover a large region, including a region subject to impact or damage but not covered within a boundary that encloses all the scattering elements 540a-540c.

Figure 6:
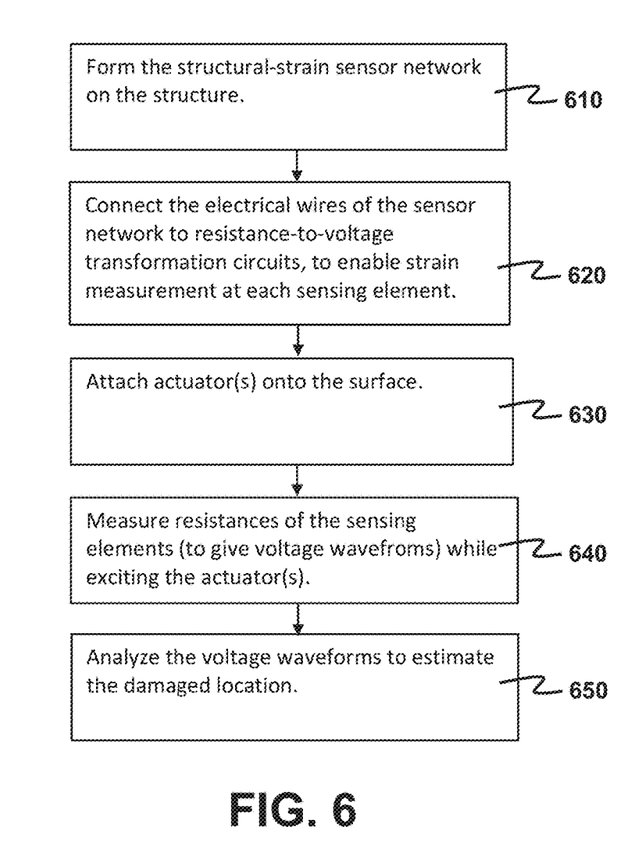
FIG. 6 is a flowchart illustrating the steps for locating a damaged location on the structure in accordance with another exemplary embodiment of the present invention.

The method for locating the damaged location is elaborated with reference to FIG. 6, which depicts a flowchart exemplarily illustrating the steps of the method.

In a step 610, a structural-strain sensor network disclosed in any of the embodiments in the first aspect of the present invention is formed on the surface 215 of the structure 210.

Figure 7:
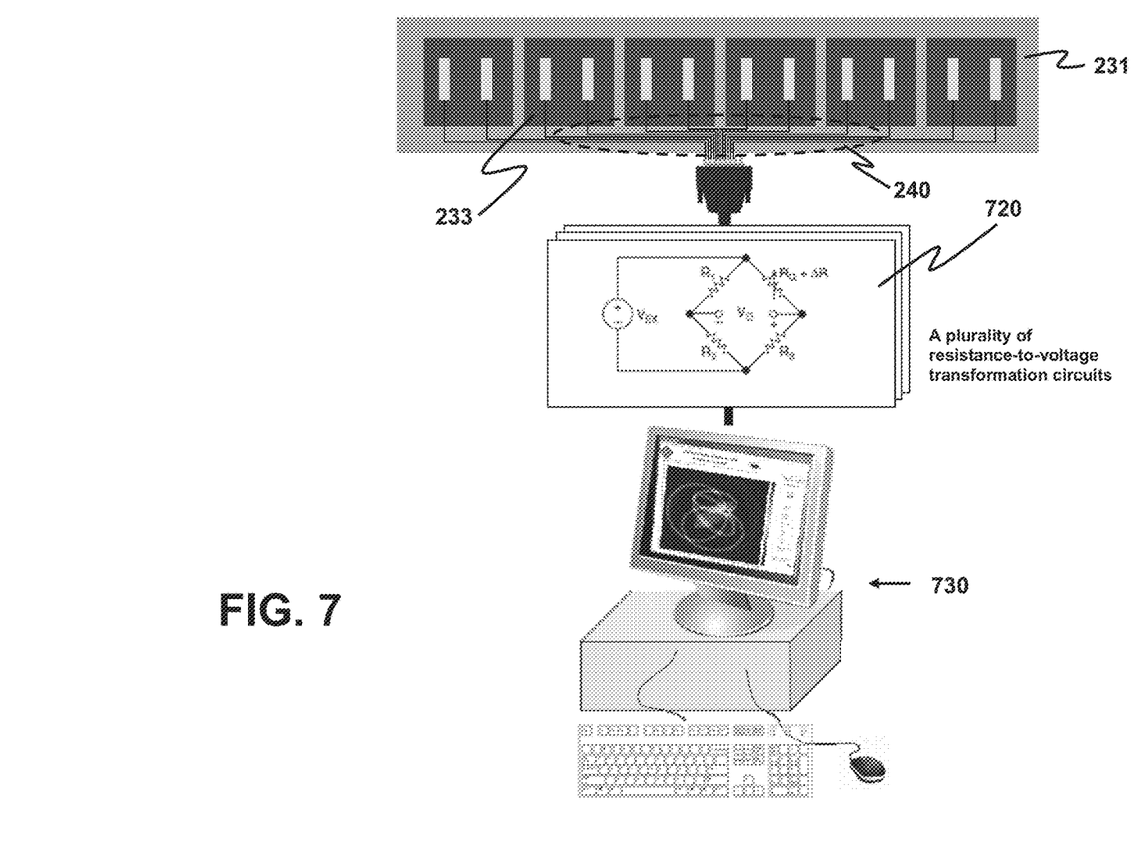
FIG. 7 is a set-up for measuring a strain at each sensing element of the sensor network in accordance with one embodiment of the present invention, the set-up incorporating the disclosed sensor network.

In a step 620, a set-up for measuring a strain at each sensing element of the sensor network is formed, where the set-up incorporates the sensor network formed in the step 610. An embodiment of the set-up is depicted in FIG. 7 for further detailing the step 620. In the step 620, the electrical wires 240 (on the section 231 of the sensing elements 230) are connected to a plurality of resistance-to-voltage transformation circuits 720 such that the resistance value of each sensing element (e.g., the selected sensing element 233) is measured by one of the resistance-to-voltage transformation circuits 720 and is reported as a voltage value. The voltage value is then acquired and analyzed by any appropriate equipment or system 730, such as a computer equipped with a voltage measurement device. Practically, the plurality of resistance-to-voltage transformation circuits 720 is implemented in an integrated circuit. Note that each of the resistance-to-voltage transformation circuits 720 is one type of transducer. It is possible that other types of transducer, such as a resistance-to-current transformation circuit, can be used. In general, any type of transducer that functions as an ohmmeter can be used.

Figure 8:
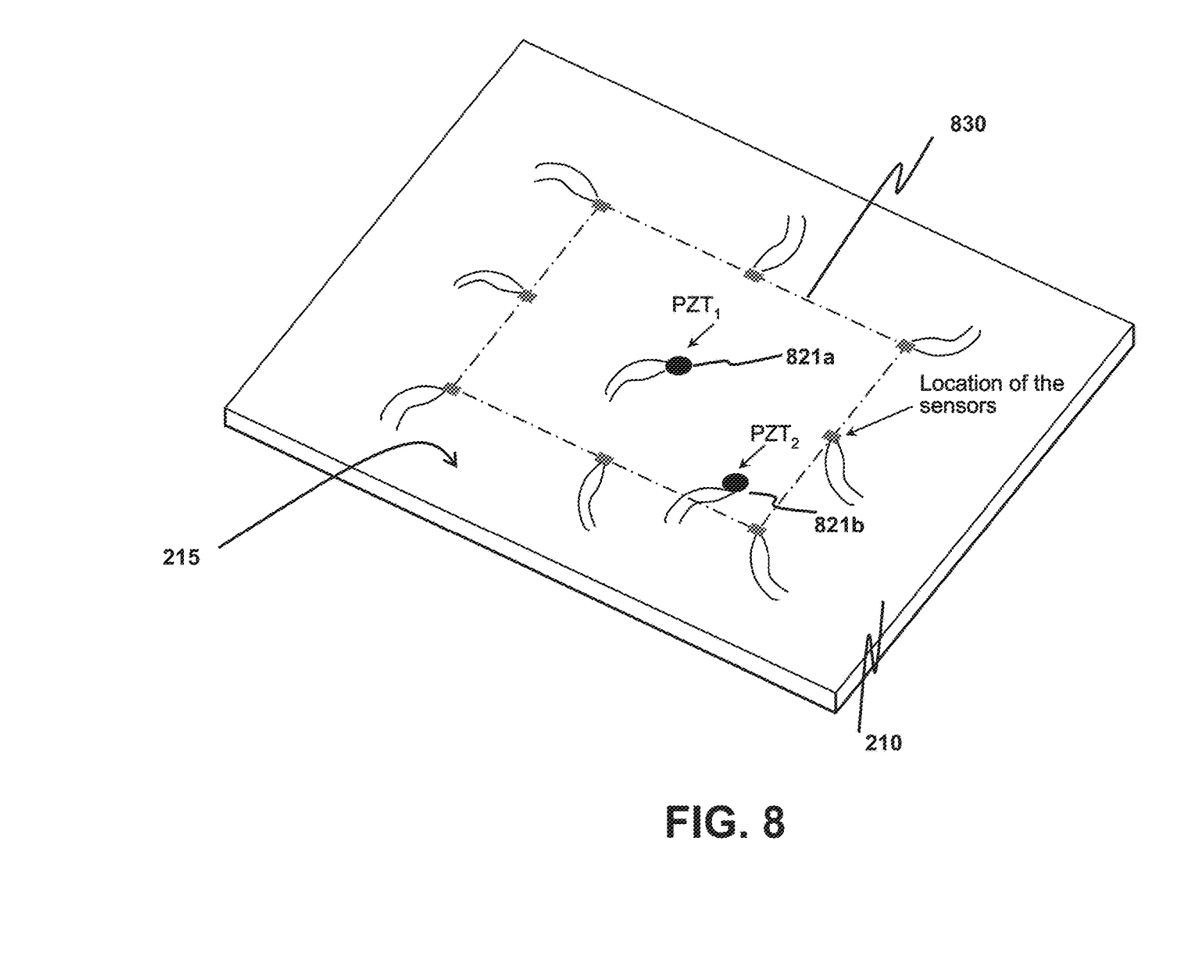
FIG. 8 is one arrangement for generating mechanical disturbance on the surface of the structure such that the generated strain is measurable by the set-up of FIG. 7.

In the method, the damaged location is detected by generating mechanical disturbance on the surface 215 of the structure 210 over time followed by analyzing voltage waveforms sensed by the sensor network. FIG. 8 depicts an arrangement for generating the mechanical disturbance. In a step 630 of the method, one or more actuators 821a-821b for generating the mechanical disturbance in the structure 210 are attached on the surface 215. Although FIG. 8 shows two actuators inside a boundary 830 of the sensor network as an example for illustration, the present invention is not limited only to the case of two actuators or the actuators being located within the sensing network's boundary. One or more actuators are used in the present invention, and the one or more actuators may be located inside or outside the boundary 830 of the sensor network. An individual actuator (i.e. any one of the actuators 821a-821b) is controllable to produce a pre-determined mechanical-disturbance waveform (i.e. the diagnostic wave 520) on which the individual actuator is located. In one option, each of the actuators 821a-821b is realized as a PZT actuator.

Refer to FIG. 6 again. In a step 640, the resistance value of the individual sensing element is measured over time while exciting the individual actuator (namely, each of the actuators 821a-821b) to produce the pre-determined mechanical-disturbance waveform. As a result, a plurality of voltage waveforms measured at the sensing elements 230 is obtained.

In a step 650, the plurality of measured voltage waveforms is analyzed to estimate the damaged location. Particularly, a guided-wave propagation model is used to estimate the damaged location from the plurality of measured voltage waveforms. As mentioned above, the book of V. Giurgiutiu and the paper of Ajay Raghavan and Carlos E. S. Cesnik may be consulted in developing the guided-wave propagation model.

A third aspect of the present invention is to provide a method for determining whether an impact is received on a structure 210 and locating the impact if the impact is received. In particular, the sensor network as disclosed according to the first aspect of the present invention is used.

Figure 9:
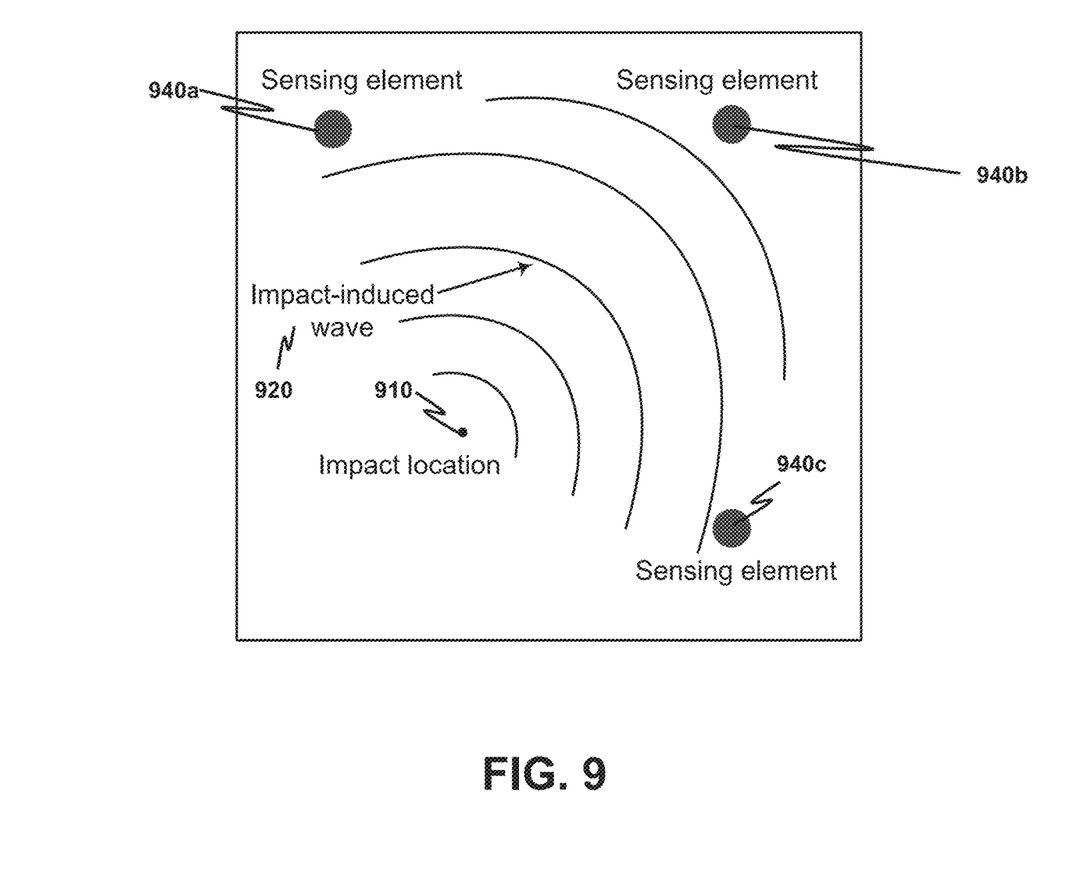
FIG. 9 depicts a simplified diagram for illustrating the determination of whether an impact is received on a structure, and the determination of the impact location if the impact is received.

FIG. 9 depicts a simplified diagram for explaining how to detect an arrival of an impact and to determine an impact location 910 if the impact is detected. When the impact is received, an impact-induced wave 920 originated from the impact location 910 is generated and propagated in the structure. The impact-induced wave 920 is also propagated on the surface of the structure and is captured by plural sensing elements 940a-940c. Hence, whether the impact is received by the structure is determined by checking whether the impact-induced wave 920 is present in the waveforms captured by the sensing elements 940a-940c. Similar to the case of locating the damaged location as illustrated above, the impact-induced wave 920 travels with a certain propagation speed, so that the impact location 910 can be estimated according to the times of arrival of the impact-induced wave recorded by the sensing elements 940a-940c. A guided-wave propagation model can be used to estimate the impact location 910 from the captured waveforms.

Figure 10:
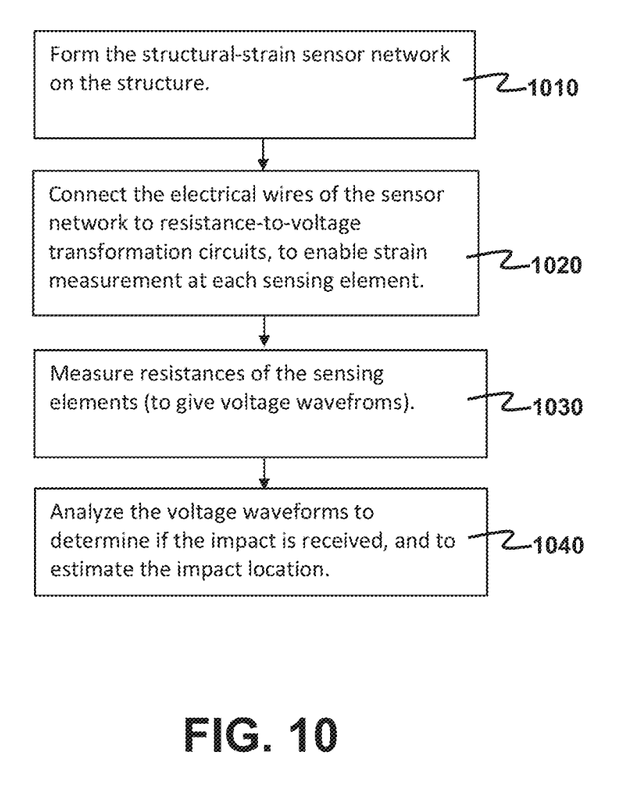
FIG. 10 is a flowchart illustrating the steps for determining if an impact is received and estimating the impact location in accordance with yet another exemplary embodiment of the present invention.

FIG. 10 depicts, in accordance with an exemplary embodiment of the present invention, a flowchart for determining whether an impact is received on a structure 210 and locating the impact if the impact is received. The procedure for determining whether the impact is received and estimating the impact location is similar to the above-disclosed method for determining the damaged location except that producing the pre-determined mechanical-disturbance waveform by the individual actuator is not required.

In a step 1010, a structural-strain sensor network disclosed in any of the embodiments in the first aspect of the present invention is formed on the surface 215 of the structure 210.

In a step 1020, a set-up for measuring a strain at each sensing element of the sensor network is formed. The set-up is the same as the one mentioned above in the step 620, and the details of the set-up are not repeated here.

In a step 1030, the resistance value of the individual sensing element is measured over time. As a result, a plurality of voltage waveforms measured at the sensing elements 230 is obtained.

In a step 1040, the plurality of measured voltage waveforms is used to determine whether the impact is received on the surface 215, and to estimate the location of the impact on the surface 215 when it is determined that the impact is received. A guided-wave propagation model is used to estimate the impact location from the plurality of measured voltage waveforms. The above-mentioned book of V. Giurgiutiu and the paper of Ajay Raghavan and Carlos E. S. Cesnik may be consulted in developing the guided-wave propagation model.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for forming a structural-strain sensor network on a surface of a structure, the sensor network comprising plural nanocomposite sensing elements dimensioned and located according to a pre-determined floor plan, all the sensing elements having a pre-determined thickness, the method comprising:

obtaining a coating material used for forming the sensing elements, the coating material being a nanocomposite hybrid material under a semi-liquid state, wherein the nanocomposite hybrid material is a composite comprising nanofillers and a thermoplastic polymer;

attaching a molding layer onto the surface, wherein the molding layer comprises plural openings dimensioned and located according to the floor plan, and the molding layer has a thickness same as the pre-determined thickness of all the sensing elements;

after the molding layer is attached to the surface, filling the openings with the coating material;

immobilizing the coating material that resides in the openings to form the sensing elements on the surface, so that an entirety of the sensing elements is collectively formed in two steps of filling the openings and immobilizing the coating material without a need to individually form each of the sensing elements;

peeling off the molding layer from the surface after the sensing elements are formed; and forming electrical wires over the surface such that two opposite electrodes are formed on an individual sensing element and the two opposite electrodes are electrically accessible via two of the electrical wires, whereby variation of a resistance value of the individual sensing element, measurable through the aforesaid two of the electrical wires, corresponds to a strain experienced at a location of the surface on which the individual sensing element is located.

2. The method of claim 1, wherein the nanofillers are selected from carbon nanotube (CNT), carbon black (CB), graphene, or a combination thereof.

3. The method of claim 1, wherein the thermoplastic polymer is selected from polyvinyl chloride (PVC) and polyvinylidene fluoride (PVDF).

4. The method of claim 1, wherein the obtaining of the coating material includes preparing the coating material, the preparing of the coating material comprising:

mixing the thermoplastic polymer and the nanofillers under a temperature between 180 to 200 degrees Celsius to form the nanocomposite hybrid material, wherein a mass ratio of the nanofillers to the polymer is selected to be within 100% to 120% of a percolation threshold; and adding a solution to the nanocomposite hybrid material for maintaining the coating material to be in the semi-liquid state.

5. The method of claim 4, wherein the solution is N-methyl-2-pyrrolidone (NMP).

6. The method of claim 5, wherein the immobilizing of the coating material that resides in the openings includes evaporating the solution at room temperature or with heating the coating material.

7. The method of claim 1, wherein the electrical wires are formed on the surface by three-dimensional (3D) printing.

8. The method of claim 1, wherein the forming of the electrical wires over the surface comprises:

forming a flexible layer having the electrical wires printed thereon; and attaching the flexible layer onto the surface at a location selected such that the two opposite electrodes on each of the sensing elements are formed, whereby the flexible layer covers the sensing elements for providing protection thereto.

9. A method for locating a damaged location on a structure, comprising:

forming a structural-strain sensor network on a surface of the structure according to the method of claim 1;

connecting the electrical wires to a plurality of resistance-to-voltage transformation circuits such that the resistance value of the individual sensing element is measured by one of the resistance-to-voltage transformation circuits and is reported as a voltage value;

attaching one or more actuators on the surface, wherein an individual actuator is controllable to produce a pre-determined mechanical-disturbance waveform on which the individual actuator is located;

measuring the resistance value of the individual sensing element over time while exciting the individual strain generator to produce the pre-determined mechanical-disturbance waveform, whereby a plurality of voltage waveforms measured at the sensing elements is obtained; and analyzing the plurality of measured voltage waveforms to estimate the damaged location.

10. The method of claim 9, wherein the damaged location is estimated according to a guided-wave propagation model.

11. The method of claim 9, wherein each of the one or more actuators is a lead zirconate titanate (PZT) actuator.

12. The method of claim 9, wherein the plurality of resistance-to-voltage transformation circuits is realized as an integrated circuit.

13. A method for determining whether an impact is received on a structure and locating the impact if the impact is received, comprising:

forming a structural-strain sensor network on a surface of the structure according to the method of claim 1;

connecting the electrical wires to a plurality of resistance-to-voltage transformation circuits such that the resistance value of the individual sensing element is measured by one of the resistance-to-voltage transformation circuits and is reported as a voltage value;

measuring the resistance value of the individual sensing element over time, whereby a plurality of voltage waveforms measured at the sensing elements is obtained; and analyzing the plurality of measured voltage waveforms to determine whether the impact is received on the surface, and to estimate the location of the impact on the surface when it is determined that the impact is received.

14. The method of claim 13, wherein the location of the impact on the surface is estimated according to a guided-wave propagation model.

15. The method of claim 13, wherein the plurality of resistance-to-voltage transformation circuits is realized as an integrated circuit.

* * * * *